Aug. 5, 1952 — A. WITTMER — 2,605,807
TRACTION-TREAD FOR TIRES
Filed Aug. 7, 1947 — 2 SHEETS—SHEET 2
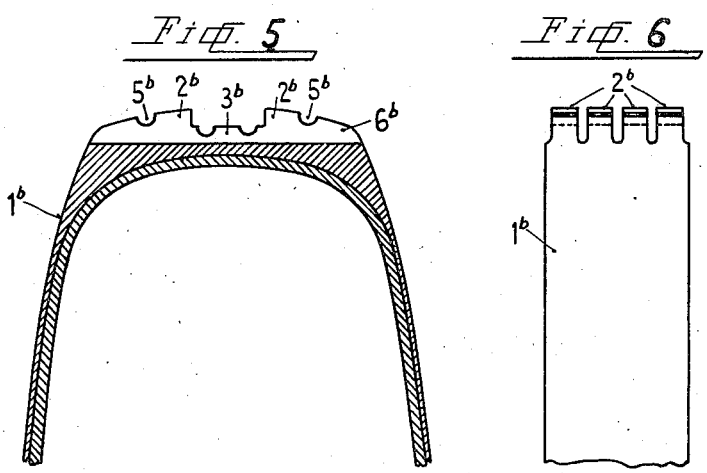
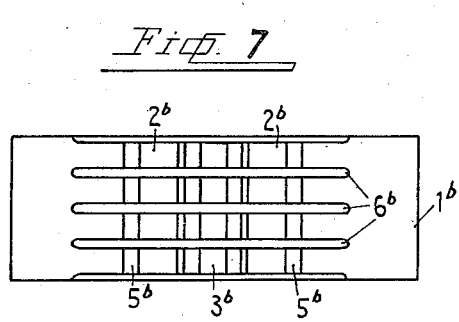
Inventor
A. Wittmer, Deceased,
By M. Wittmer, Legal Heir, Patented Aug. 5, 1952

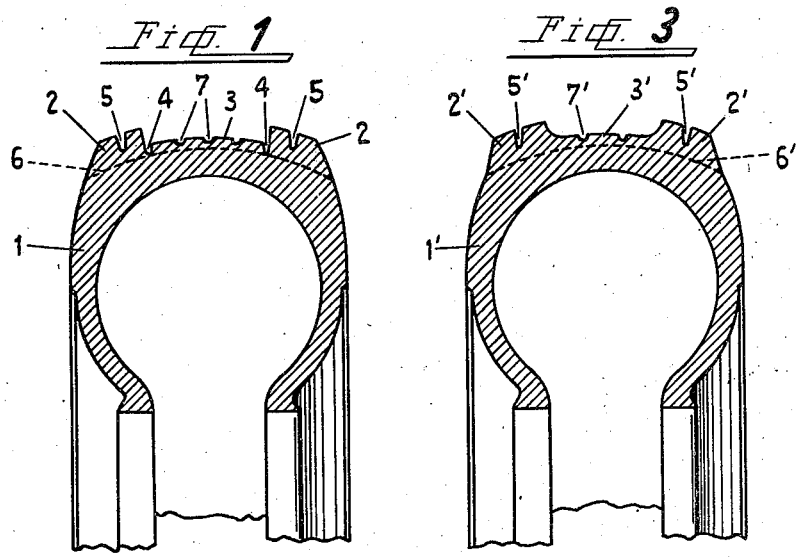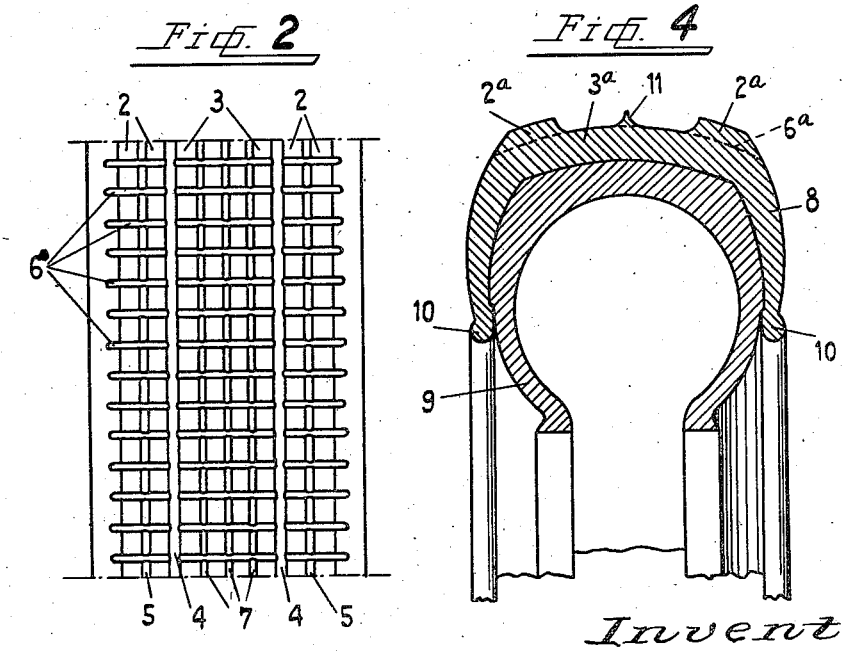

2,605,807

UNITED STATES PATENT OFFICE 2,605,807

TRACTION TREAD FOR TIRES

Arnold Wittmer, deceased, late of Arosa, Switzerland, by Maria Wittmer, legal heir, Arosa, Switzerland Application August 7, 1947, Serial No. 767,106
In Switzerland March 11, 1939

Section 1, Public Law 690, August 8, 1946
Patent expires March 11, 1959

4 Claims. (Cl. 152—209)

This invention relates to tires for self-propelled vehicles and particularly to a traction-tread of such tires.

The traction-tread on pneumatic tires, or a traction-tread employed with another commercial tire forming a detachable cover, according to the present invention is provided with a novel skid-proof design for use on vehicles which operate on wet and slippery roads.

The main object of the present invention is to provide a traction-tread having two lateral circumferential ribs, a central circumferential furrow and the entire width of the traction-tread is provided with spaced circumferential slots, for creating, when used on a vehicle driven over a snow covered road, a cam or rib of pressed snow formed between the lateral ribs of the traction-tread engaging the inner side-walls of the ribs, thereby increasing the grip of the traction-tread and decreasing side slipping of the vehicle.

In a preferred form of my invention I provide furthermore transversal slots rectangularly related to the circumferential slots.

Another object of the present invention is to provide a detachable traction-tread of channel-shape which in the deflated condition of the tube is adjusted over a normal tire which is provided with edges capable of taking a firm hold upon said tire when the tube is inflated.

Other objects and advantages will be apparent from the following description when read in connection with the accompanying drawings, in which:

Figure 1 is a cross-section through a tire provided with a traction-tread according to the present invention.

Figure 2 is an extending top plan view of a portion of the tire shown in Figure 1.

Figure 3 is a cross-section through a tire provided with a traction-tread according to the present invention and showing a modified form.

Figure 4 is a cross-section of a tire provided with a detachable channel-shaped cover provided with a traction-tread according to the present invention in working position.

Figure 5 is a cross-section through a tire provided with a traction-tread according to the present invention and showing another modified form.

Figure 6 is a side-view according to Figure 5, and

Figure 7 is a plan view of the portion of the tire shown in Figures 5 and 6.

Referring to the drawing reference numeral 1 designates a tire provided with lateral ribs 2, symmetrically disposed in relation to the middle-plane of the tire on each side of the traction-tread, and a centrally disposed furrow provided with circumferential spaced slots 7 and intermediate parts 3 and deeper slots 4 disposed adjacent each rib 2. The distance between the circumferential ribs 2 is substantially half of the width of the traction-tread, inclusive of the circumferential ribs. Thereby each of the lateral circumferential ribs is substantially ¼ of the width of the traction-tread. The circumferential ribs 2 are each provided with a circumferential slot 5. Furthermore transverse slots 6 rectangularly related to the circumferential slots 4, 5 and 7 are equally distributed over the entire circumferential surface of the traction-tread.

The traction-tread according to Figure 3 is also provided with two circumferential ribs 2' and a centrally located furrow 3'. The circumferential ribs 2' are also provided with circumferential slots 5'. At variance with the design shown in Figure 1, the furrow comprises only two circumferential slots 7' and continues smoothly to the ribs 2', whereas, in the aforedescribed arrangement the base of the furrow is provided with a slot shown at 4 adjacent each rib 2. Transversal slots 6' are also equally distributed over the entire circumferential surface of the traction-tread.

The traction-tread according to Figure 4 is provided on a detachable coat or cover 8 capable of being adjusted upon the tire 9. The cover is of channel-shaped cross-section and comprises suitably shaped edges in the form of pads 10. The edges 10 extend beyond the maximum diameter of the tire. The cover 8 is set in place in the collapsed condition of the tire 9, so as to firmly hold on to the tire 9, when the tube of the latter is inflated. It is possible to provide the edges 10, if desired, with holding means to prevent the traction-tread from being laterally displaced relative to the tire. In this case no circumferential slots 7 are provided in the furrow $3^a$ between the ribs $2^a$, but instead a raised circumferential cam or rib 11 is included in the middle of the base of the furrow. Transverse slots $6^a$ are also provided.

In the arrangement shown in Figures 5 to 7 the tire $1^b$ is provided with the raised ribs $2^b$ with the centrally disposed furrow between these ribs. The ribs are each provided with the circumferential slots or grooves $5^b$ and the body of the tire is further provided with the circumferentially spaced, transversely extending, slots or grooves $6^b$. These slots or grooves $6^b$ are of substantial depth and extend across the body of the tire through the ribs and through the body of the tread beneath the furrow. As shown in the drawings additional circumferential slots or grooves are provided in the base of the furrow and these slots or grooves have a depth not exceeding the depth of the transverse slots $6^b$. With the arrangement shown in this modification the gripping effect of the square blocks formed on the surface of the circumferential ribs is increased.

It is therefore clear that the present invention provides a pneumatic tire tread including an annular flexible and resilient body that is curved transversely in cross-section with the outer surface of the body provided with spaced circumferential ribs that are symmetrically disposed each on an opposite side of the mid plane of the body. A circumferential furrow is provided which extends between the ribs and further extends uninterruptedly around the body. This furrow has a transverse extent varying from approximately one-fourth to one-half the transverse extent of the treads and has a substantial depth so that in operation upon snow, the ribs will flex toward one another to provide a cam or ridge of compressed snow between the facing surfaces of the ribs which minimizes side slippage of the vehicle utilizing the tires. Additionally, the body of the tread is provided with the circumferential series of transversely extending grooves 6, 6', $6^a$ or $6^b$. These grooves extend across the body of the tire through the ribs and in the arrangements in Figures 1, 3 and 5 through the body of the tread beneath the furrow. The arrangement of the transverse grooves provides for flexibility of the rib segments in the circumferential direction of the tire.

Additionally the circumferential grooves provided in the base of the furrow and in the ribs, in the modification shown in Figures 1, 3 and 5, facilitate flexure of the ribs toward one another, on the one hand, and increase traction and minimize side slippage on the other.

It is claimed and desired to secure by Letters Patent:

1. A pneumatic tire tread including an annular flexible and resilient body curved transversely in cross section and provided on the outer surface with spaced circumferential side ribs symmetrically disposed in relation to the middle plane of the body, the body being provided with a circumferential furrow positioned between the ribs, the ribs and the furrow being provided with circumferential slots and the body being also provided with a series of transverse slots intersecting the ribs, furrow and circumferential slots.

2. A pneumatic tire tread as claimed in claim 1 in which additional deep circumferential slots are provided at the juncture of the ribs and furrow and in which the distance between the circumferential ribs is substantially one-half of the width of the tread inclusive of the circumferential ribs so that the width of each circumferential rib is substantially one-fourth of the width of the tread.

3. A pneumatic tire tread including an annular flexible and resilient body curved transversely in cross-section and provided on the outer circumferential surface with spaced circumferential ribs symmetrically disposed each on an opposite side of the mid plane of the body, said body having a circumferential furrow extending between the ribs and extending uninterruptedly around the body and said body further having a circumferential series of transversely extending grooves extending across the body through the ribs and through the body of the tread beneath the furrow.

4. A pneumatic tire tread as defined in and by claim 3 and in which the base of the furrow is provided with spaced circumferential grooves extending completely therearound on opposite sides of the mid plane of the base of the groove, said circumferential grooves having a depth not exceeding the depth of the transverse grooves and facilitating flexure of the ribs toward one another when the tire is in use and subjected to the weight of a vehicle.

MARIA WITTMER.

*Legal Heir to Estate of Arnold Wittmer, Deceased.*

REFERENCES CITED

The following references are of record in the file of this patent:

UNITED STATES PATENTS

| Number | Name | Date |
|---|---|---|
| 880,274 | Brophy | Feb. 25, 1908 |
| 1,581,590 | Moore | Apr. 20, 1926 |
| 2,122,736 | Bourdon | July 5, 1938 |
| 2,130,524 | Clark | Sept. 20, 1938 |
| 2,302,027 | Havens | Nov. 17, 1942 |

FOREIGN PATENTS

| Number | Country | Date |
|---|---|---|
| 208,273 | Switzerland | June 17, 1940 |